United States Patent
Mo et al.

(10) Patent No.: US 9,495,706 B2
(45) Date of Patent: Nov. 15, 2016

(54) SY BASED INTEGRATED POLICY AND CHARGING CONTROL

(75) Inventors: Fan Mo, Ottawa (CA); Simon Chen, Ottawa (CA); Hamdy Farid, Kanata (CA); Ivaylo Tanouchev, Ottawa (CA)

(73) Assignee: Alcatel Lucent, Boulogne-Billancourt (FR)

( * ) Notice: Subject to any disclaimer, the term of this patent is extended or adjusted under 35 U.S.C. 154(b) by 269 days.

(21) Appl. No.: 13/251,650

(22) Filed: Oct. 3, 2011

(65) Prior Publication Data
US 2013/0085909 A1 Apr. 4, 2013

(51) Int. Cl.
| | | |
|---|---|---|
| *H04L 12/14* | (2006.01) | |
| *G06Q 40/02* | (2012.01) | |
| *G06Q 30/04* | (2012.01) | |
| *H04M 15/00* | (2006.01) | |

(52) U.S. Cl.
CPC ............ *G06Q 40/025* (2013.01); *G06Q 30/04* (2013.01); *H04L 12/14* (2013.01); *H04L 12/1407* (2013.01); *H04L 12/1403* (2013.01); *H04L 12/1432* (2013.01); *H04M 15/66* (2013.01)

(58) Field of Classification Search
CPC .................. H04M 15/66; H04M 15/00; H04M 15/64; H04M 15/8016; H04M 15/852; H04M 15/80; H04L 12/14; H04L 12/1403; H04L 12/1407; H04L 47/20
USPC ............ 709/224, 223; 705/409, 44, 34, 400; 455/405, 406; 370/252
See application file for complete search history.

(56) References Cited

U.S. PATENT DOCUMENTS

| | | | | |
|---|---|---|---|---|
| 7,890,657 | B2* | 2/2011 | MacDonald | H04L 12/14 709/227 |
| 7,937,300 | B2* | 5/2011 | Foottit | G06Q 10/00 370/401 |
| 8,630,925 | B2* | 1/2014 | Bystrom et al. | 705/30 |
| 8,813,168 | B2* | 8/2014 | Riley et al. | 726/1 |
| 2007/0061268 | A1* | 3/2007 | Herold et al. | 705/59 |
| 2008/0010379 | A1* | 1/2008 | Zhao | 709/226 |

(Continued)

FOREIGN PATENT DOCUMENTS

WO 2010049002 A1 5/2010

OTHER PUBLICATIONS

OPENET, Possible Flows on Sy. 3GPP TSG SA WG2 Meeting #78, TD S2-101313 [online], Feb. 26, 2010 [retrieved Nov. 19, 2012]; retrieved from the Internet: URL:http://www.3gpp.org/ftp/Specs/html-info/TDocExMtg--S2-78-280 16.htm.

(Continued)

*Primary Examiner* — Ryan Zeender
*Assistant Examiner* — Milena Racic
(74) *Attorney, Agent, or Firm* — Kramer & Amado, P.C.

(57) ABSTRACT

Various exemplary embodiments relate to a method for managing subscriber usage in a mobile network by a policy and charging rules function (PCRF) including: receiving a credit control request (CCR) message from a policy and enforcement rules function (PCEF) for an application; determining if a Sy connection to an online charging system (OCS) is necessary to implement the CCR; determining if a Sy session is present; sending an application authorization request (AAR) message to the OCS; binding a counter to the application; determining a policy to apply based upon the application; and sending a credit control answer (CCA) message to the PCEF to effect the policy.

14 Claims, 4 Drawing Sheets

(56) References Cited

U.S. PATENT DOCUMENTS

| | | | |
|---|---|---|---|
| 2010/0015945 A1 | 1/2010 | Shuman et al. | |
| 2010/0017846 A1* | 1/2010 | Huang | H04L 12/14 |
| | | | 726/1 |
| 2011/0167471 A1 | 7/2011 | Riley et al. | |
| 2012/0257499 A1* | 10/2012 | Chatterjee | H04W 28/0284 |
| | | | 370/232 |
| 2012/0320801 A1* | 12/2012 | Yang | H04L 12/14 |
| | | | 370/259 |

OTHER PUBLICATIONS

International Search Report and Written Opinion in corresponding application No. PCTCA2012/050667, mailed Dec. 14, 2012.
3rd Generaration Partnership Project: Technical Specification Group Services and Systems Apects: Study on Policy and Solutiona and Enhancements (Release 10), 3GPP Standard; 3GPP TR 23,813, 3rd Generation Partnership Project (3GPP), Mobile Competence Centre; 650 Route Des Lusioles; F-06921 Sophia-Antipolis Cedex; France.
European Search Report for Patent Application EP12838251 dated Mar. 18, 2015.
Preliminary Rejection for Korean Patent Application No. 2014-7008814 dated Mar. 19, 2015.
ZTE: Proposal for optimization of PCC procedures by Sy reference enhancement, 3GPP TSG SA WG2 Meeting #76, Feb. 22-26, 2010, San Francisco.

* cited by examiner

SY BASED INTEGRATED POLICY AND CHARGING CONTROL

TECHNICAL FIELD

Various exemplary embodiments disclosed herein relate generally to Sy based integrated policy and charging control.

BACKGROUND

A mobile network may use a policy and charging rules function (PCRF) to implement rule based polices within the mobile network. Such PCRF may also monitor usage in the mobile network by installing monitoring keys in a packet data network gateway (PGW) which acts as a policy and charging enforcement function (PCEF). But many existing networks have existing online charging systems (OCS) that monitor usage.

SUMMARY

Therefore there remains a need for a system that integrates the powerful and flexible rule engine in the PCRF along with the usage monitoring capabilities of an existing OCS. Presently there is no approved standard interface between the PCRF and the OCS. The Sy interface has been proposed to connect the PCRF and the OCS, but the standards for this interface are still in development. Below, embodiments are described that allow communication between the PCRF and the OCS to allow for the PCRF to make policy decisions and implementation based upon usage information received from the OCS.

A brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method for managing subscriber usage in a mobile network by a policy and charging rules function (PCRF) including: receiving a credit control request (CCR) message from a policy and enforcement rules function (PCEF) for an application; determining if a Sy connection to an online charging system (OCS) is necessary to implement the CCR; determining if a Sy session is present; sending an application authorization request (AAR) message to the OCS; binding a counter to the application; determining a policy to apply based upon the application; and sending a credit control answer (CCA) message to the PCEF to effect the policy.

Various exemplary embodiments relate to a method for managing subscriber usage in a mobile network by a policy and charging rules function (PCRF) including: receiving an indication from an online charging system (OCS) that a usage threshold has been crossed; determining a policy to apply based upon the threshold crossing; and sending a reauthorization request (RAR) message to the PCEF to effect the policy.

Various exemplary embodiments relate to a tangible and non-transitory machine-readable storage medium encoded with instructions thereon for execution by a policy and charging rules function (PCRF), wherein said tangible and non-transitory machine-readable storage medium inducing: instructions for receiving a credit control request (CCR) message from a policy and enforcement rules function (PCEF) for an application; instructions for determining if a Sy connection to an online charging system (OCS) is necessary to implement the CCR; instructions for determining if a Sy session is present; instructions for sending an application authorization request (AAR). message to the OCS; instructions for binding a counter to the application; instructions for determining a policy to apply based upon the application; and instructions for sending a credit control answer (CCA) message to the PCEF to effect the policy.

BRIEF DESCRIPTION OF THE DRAWINGS

In order to better understand various exemplary embodiments, reference is made to the accompanying drawings, wherein.

DETAILED DESCRIPTION

Figure 1:
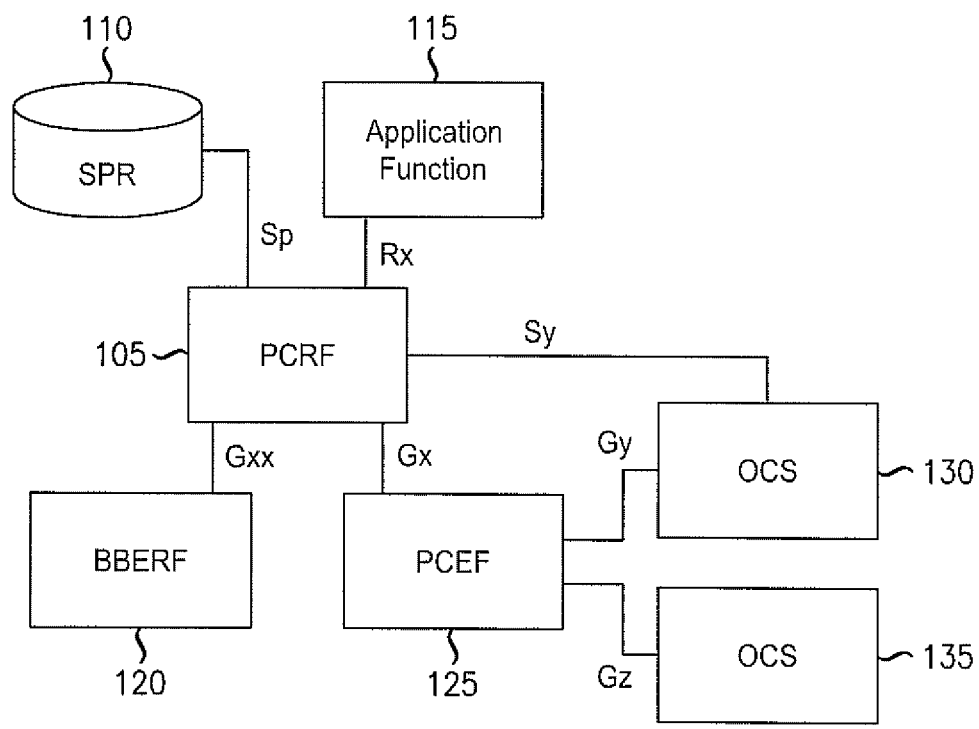
FIG. 1 illustrates an exemplary system where the PCRF receives usage information from the OCS.

Referring now to the drawings, in which like numerals refer to like components or steps, there are disclosed broad aspects of various exemplary embodiments.

FIG. 1 illustrates an exemplary system where the PCRF receives usage information from the OCS. The system 100 may include a policy and charging rules function PRCF 105, subscriber profile repository (SPR) 110, application function (AF) 115, bearer binding and event reporting function (BBERF) 120, policy and charging enforcement function (PCEF) 125, online charging system (OCS) 130, and offline charging system (OFCS) 135.

PCRF 105 may be a device that receives requests related to service data flows (SDFs) and IP-CAN sessions, generates PCC rules, and provides PCC rules to the PCEF 125 and/or other PCEFs (not shown). PCRF 105 may be in communication with AF 115 via an Rx interface. PCRF 105 may receive an application request in the form of an application authorization request (AAR) from AF 115. Upon receipt of AAR, PCRF 105 may generate at least one new PCC rule for fulfilling the application request.

PCRF 105 may also be in communication BBERF 120 and PCEF 125 via a Gxx and a Gx interface, respectively. PCRF 105 may receive a request in the form of a credit control request (CCR) from BBERF 120 or PCEF 125. As with AAR, upon receipt of CCR, PCRF 105 may take appropriate action in response, such as, for example, generating at least one new PCC rule for fulfilling and/or responding to the CCR. In various embodiments, AAR and CCR may represent two independent requests to be processed separately, while in other embodiments, AAR and CCR may carry information regarding a single request, and PCRF 105 may take action based on the combination of AAR and CCR. In various embodiments, PCRF 105 may be capable of handling both single-message and paired-message requests.

Upon creating a new PCC rule or upon request by the PCEF 125, PCRF 105 may provide a PCC rule to PCEF 125 via the Gx interface. In various embodiments, such as those implementing the PMIP standard for example, PCRF 105 may also generate quality of service (QoS) rules. Upon creating a new QoS rule or upon request by the BBERF 120, PCRF 105 may provide a QoS rule to BBERF 120 via the Gxx interface. These QoS rules may be applied based upon usage information received from the OCS 130. When the OCS indicates that certain usage thresholds have been reached, the PCRF 105 may change the QoS related to a subscriber and apply updated QoS rules to the PCEF 125.

Subscription profile repository (SPR) 110 may be a device that stores information related to subscribers to the subscriber network. Thus, SPR 110 may include a machine-readable storage medium such as read-only memory (ROM), random-access memory (RAM), magnetic disk storage media, optical storage media, flash-memory devices, and/or similar storage media. SPR 110 may be a component of PCRF 105 or may constitute an independent node within the subscriber network. Data stored by SPR 110 may include an identifier of each subscriber and indications of subscription information for each subscriber such as subscriber category, bandwidth limits, charging parameters, and subscriber priority.

Application function (AF) 115 may be a device that provides a known application service to subscriber user equipment. Thus, AF 115 may be a server or other device that provides, for example, a video streaming or voice communication service to subscriber user equipment. AF 115 may further be in communication with the PCRF 105 via an Rx interface. When AF 115 is to begin providing known application service to subscriber user equipment, AF 115 may generate an application request message, such as an application authorization request (AAR) according to the Diameter protocol, to notify the PCRF 105 that resources should be allocated for the application service. This application request message may include information such as an identification of a subscriber using the application service and an identification of service data flows that are desired to be established in order to provide the requested service. AF 115 may communicate such an application request to the PCRF 105 via the Rx interface.

The BBERF 120 may be a serving gateway (SGW). BBERF 120 may be a device that provides gateway access to the system 100 to an end user. BBERF 120 may be the first device within the system 100 that receives packets sent by subscriber user equipment. BBERF 120 may perform a number of functions such as, for example, managing mobility of subscriber user equipment between multiple base stations (not shown) and enforcing particular quality of service (QoS) characteristics for each flow being served.

PCEF 125 may be a packet data network gateway. PCEF 125 may be a device that provides gateway access to packet data network to an end user. PCEF 125 may be the final device within the system 100 that receives packets sent by subscriber user equipment toward packet data network (not shown) via BBERF 120. PCEF 125 may enforce policy and charging control (PCC) rules for each service data flow (SDF). Therefore, PCEF 125 may be a policy and charging enforcement node (PCEN). PCEF 125 may include a number of additional features such as, for example, packet filtering, deep packet inspection, and subscriber charging support. PCEF 125 may also be responsible for requesting resource allocation for unknown application services. Upon receiving a request for an unknown application service from subscriber user equipment, PCEF 125 may construct a credit control request (CCR), such as CCR, requesting an appropriate allocation of resources and forward the request to PCRF 105.

OCS 130 may be used to track pre-paid usage of subscribers. For pre-paid usage charging occurs in real-time, where the service cost is deducted from the subscriber balance while the service is in operation. The OCS 130 may receive usage information from the PCEF 125. Further the OCS 130 may install monitoring keys in the PCEF 125 to monitor certain types of subscriber usage. The OCS receives information related to usage limits associated with the subscriber. Further, the OCS may receive threshold information based upon various desired usage thresholds. When a threshold is reached certain policies may become applicable. The OCS may also communicate with the PCRF 105 via the Sy interface. The OCS may send usage information to the PCRF 105 as well as indications when various thresholds have been exceeded.

OFCS 135 may be used to track post-paid usage of subscribers, where the provided services are not paid at the time of their usage but rather in a periodic manner, such as at the end of each month. However, while the service is in use, the usage is logged as a Call Detail Record (CDR) that will be processed later by a billing system. The OFCS 135 may receive usage information from the PCEF 125. Further the OFCS 135 may install monitoring keys in the PCEF 125 to monitor certain types of subscriber usage. The OFCS 135 receives information related to usage limits associated with the subscriber. Further, the OFCS 135 may receive threshold information based upon various desired usage thresholds. When a threshold is reached certain policies may become applicable.

Figure 2:
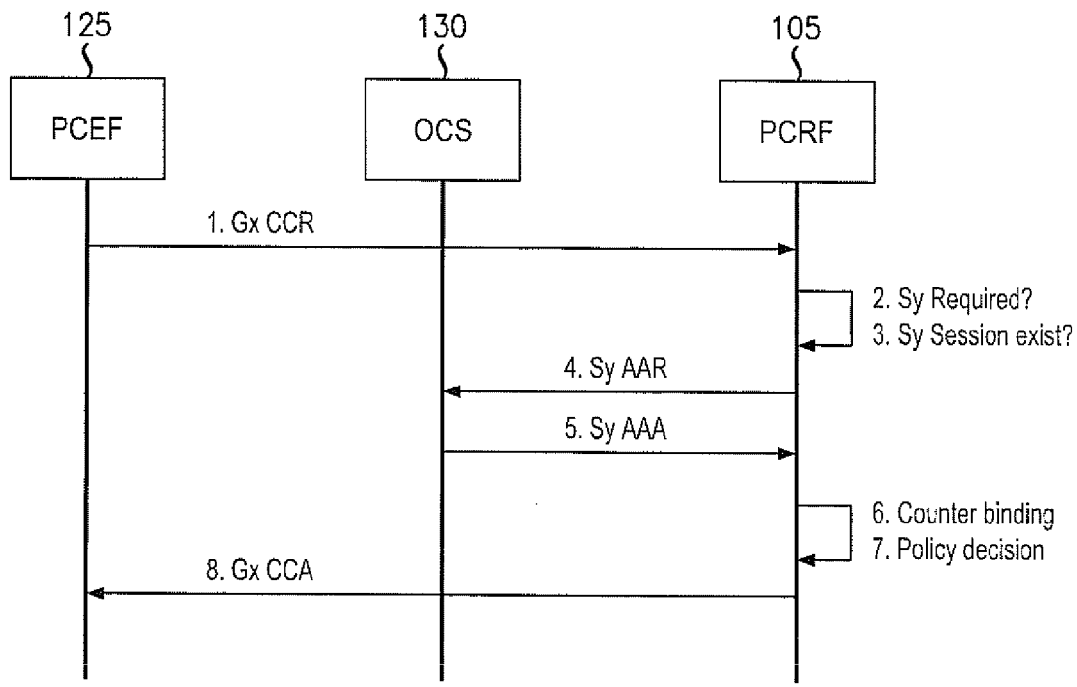
FIG. 2 illustrates an exemplary process flow of an initiation of a subscriber session and setting up monitoring usage of the session by the OCS.

FIG. 2 illustrates an exemplary process flow of an initiation of a subscriber session and setting up monitoring usage of the session by the OCS. The PCEF 125, OCS 130, and the PCRF 105 communicate via various messages when a subscriber session is initiated. First, the PCEF 125 may send a CCR via the Gx interface to the PCRF 105. The PCRF 105 may receive and process the CCR. The PCRF may determine if the CCR requires the Sy interface. The Sy interface may be required when an AAR needs to be made to the OCS 130 in order to establish the subscriber session. Once the need for the Sy interface has been established, then the PCRF 105 determines if a Sy session exists. If not then the Sy session is initiated. Next the PCRF 105 sends a Sy AAR message to the OCS 130 via the Sy interface. The OCS 130 then sends a application authorization answer message Sy AAA to the PCRF 105 to acknowledge that the Sy AAR message was received and implemented. The OCS 130 sends information to the PCRF 105 regarding the usage of the subscriber and the relationship of this subscriber usage to any existing thresholds. Indication of the subscriber usage status is received by the PCRF 105 and the PCRF 105 determines if a policy action is necessary. For example, if a first usage threshold of 80% is exceeded then the policy decision is to transmit a message to the user to indicated that they have used 80% of their allotted usage limit. Further, other limits may cause the QoS of the subscriber to be reduced, cause a message to be sent to the subscriber indicating current usage and the usage limit, or even deny the subscriber further access to the AF 115. Any policy actions to be carried out may be implemented by the PCRF 105 sending Gx CCA message to the PCEF 125. The PCEF may effect the policy action indicated by the Gx CCA message.

Figure 3:
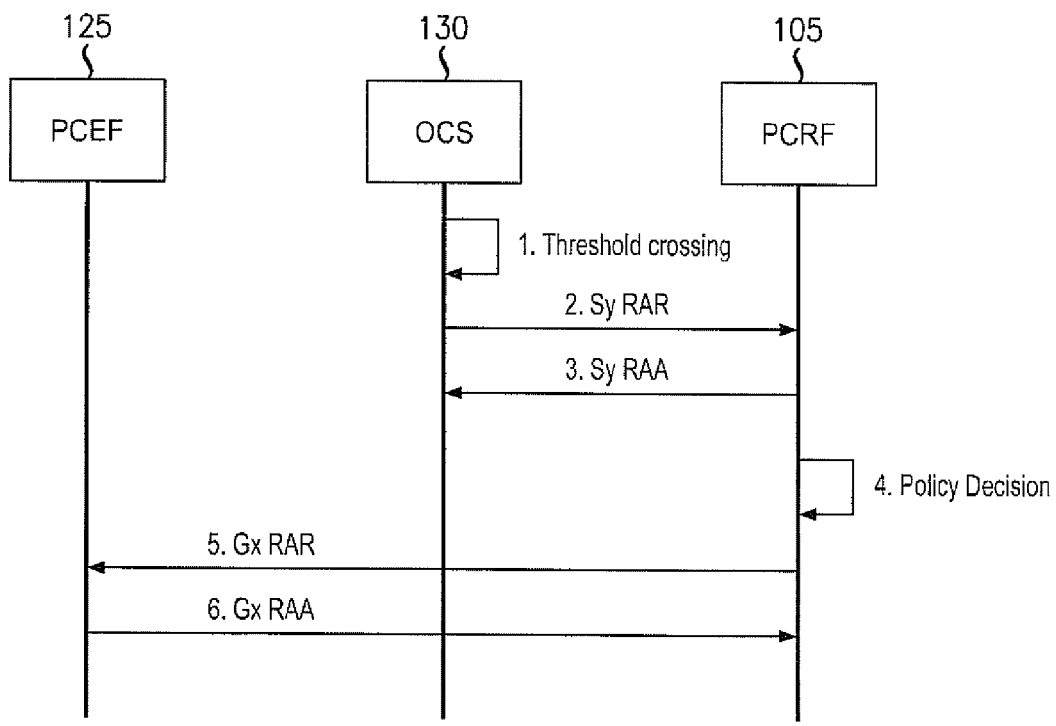
FIG. 3 illustrates an exemplary process flow of updating a usage policy when subscriber usage exceeds a predetermined threshold.

FIG. 3 illustrates an exemplary process flow of updating a usage policy when subscriber usage exceeds a predetermined threshold. The PCEF 125, OCS 130, and the PCRF 105 communicate via various messages when subscriber usage exceeds a predetermined threshold. First, OCS 130 receives usage information related to the subscriber and compares it to a related threshold. When the OCS 130 detects a usage threshold crossing, the OCS 130 sends a Sy RAR message to the PCRF 105 indicating that the threshold has been crossed. The Sy RAR message may include information indicating the session, subscriber information, usage information, threshold, etc. The PCRF 105 then may send a Sy RAA message back to OCS 130 to acknowledge receipt of the Sy RAR message. As described above, the PCRF 105 may make a policy decision regarding the session and determines any action to carry out, such as for example, changing QoS, denying service, sending a message to the subscriber, etc. The PCRF 105 may send a Gx RAR message to the PCEF 125 to indicate the action to carry out. The PCEF 125 may send a Gx RAA message back to PCRF 105 to acknowledge receipt of the Gx BAR message.

Figure 4:
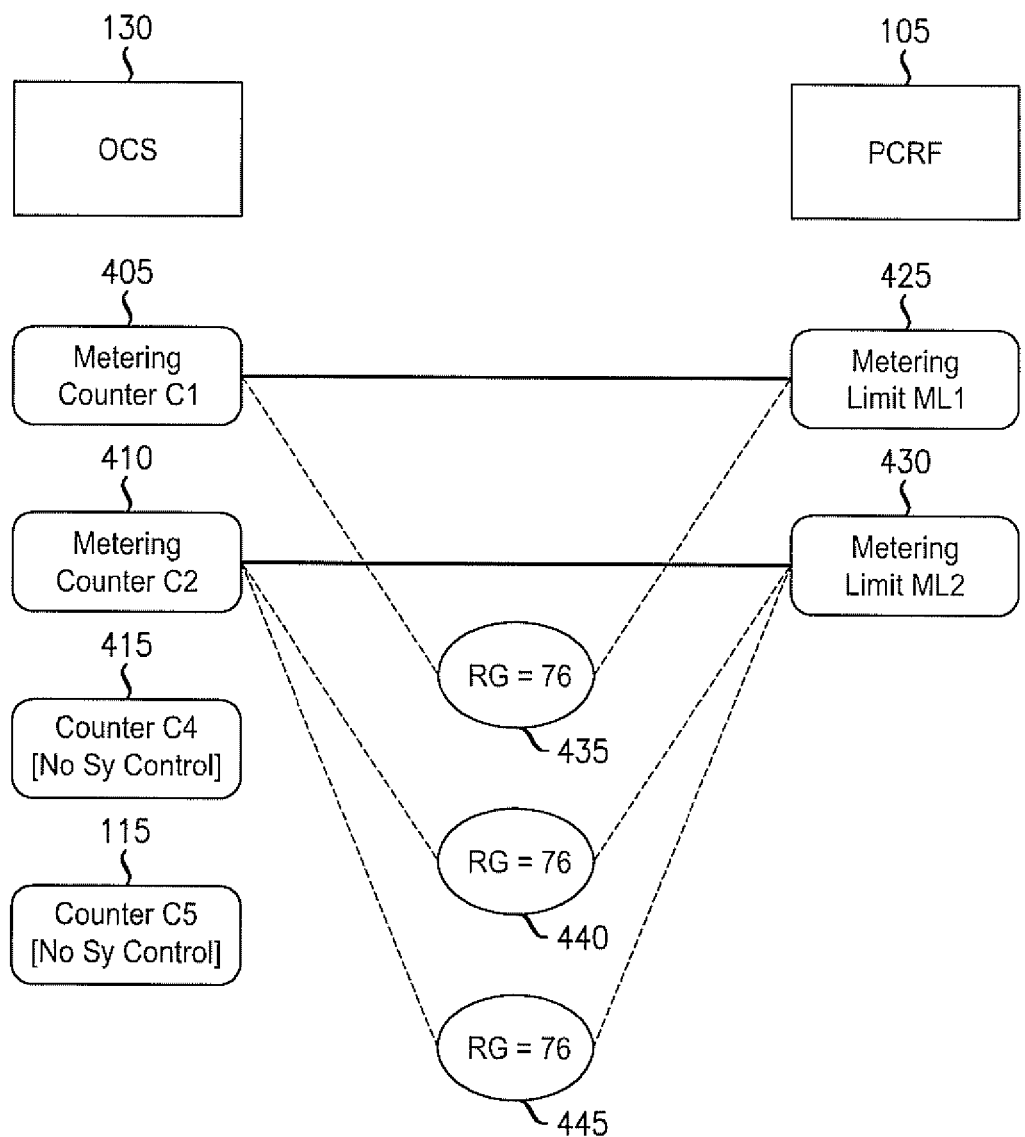
FIG. 4 illustrates a mapping of between usage counters in the OCS and metering limits in the PCRF.

Because the OCS 130 and the PCRF 105 may use different units in measuring usage, for example currency and megabytes, it may be necessary to provide a mapping between the metering counters in the OCS 130 and metering limits in the PCRF 105. FIG. 4 illustrates a mapping of between usage counters in the OCS 130 and metering limits in the PCRF 105. The OCS 130 may include metering counter C1 405, metering counter C2 410, metering counter C4 410, and metering counter C5 420. Metering counters C4 and C5 are not controlled over the Sy interface. These metering counters count various usage. The PCRF 105 may include metering limit ML1 425 and metering limit ML2 430. The metering limits are used to determine when a subscriber exceeds some specified usage. Metering counter C1 405 may be associated with metering limit ML1 425, where the metering counter C1 405 is compared to the metering limit ML1 425. In order to make the comparison, a rating group 435 may be used to convert either the metering counter C1 405 into the same units as the metering counter ML1 425 or vice versa. Metering counter C2 410 may be associated with metering counter ML2 430. This grouping may actually have two rating groups 440 and 445 associated with it. One rating group may be used when a subscriber accesses their home network and the other may be used while roaming. Each rating group may have an associated ID number as shown. A rating group may be applicable to various metering counter—metering limit groups. Further, as illustrated various rating groups may be associated with a group, where the rating group to be applied may be determined by applicability conditions.

Figure 5:
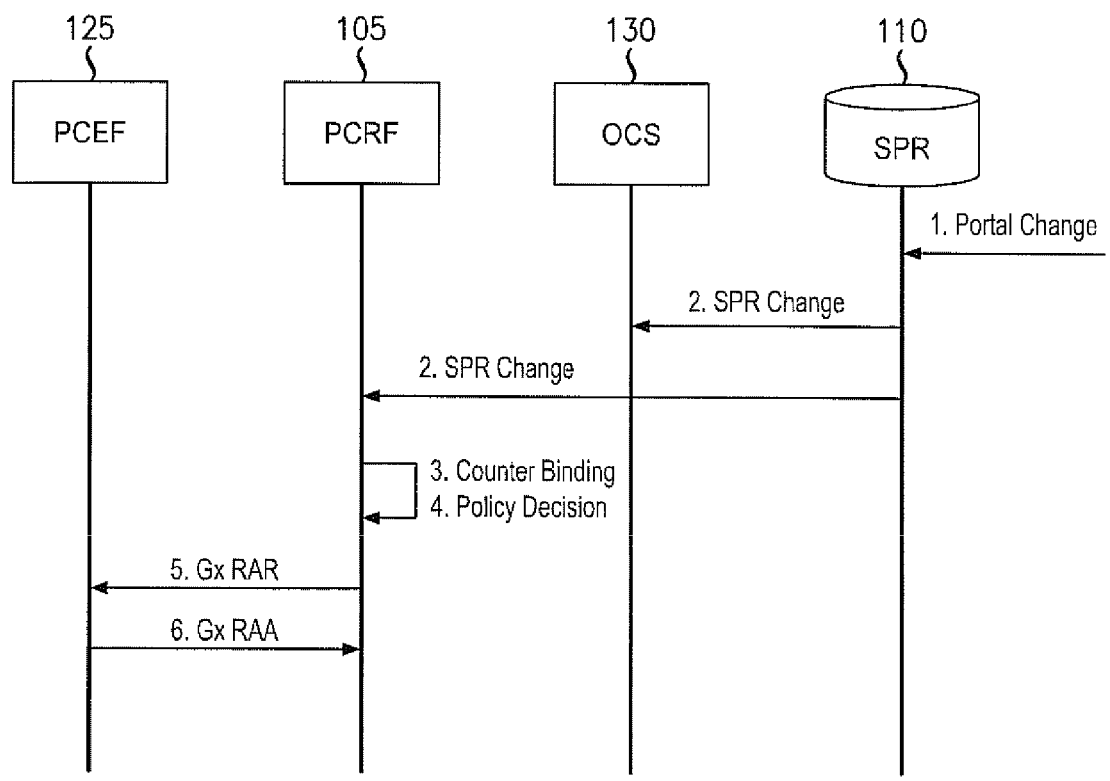
FIG. 5 illustrates an exemplary process flow for when a subscriber changes its subscription.

FIG. 5 illustrates an exemplary process flow for when a subscriber changes its subscription. The PCEF 125, PCRF 105, OCS 130, and SPR 110 communicate via various messages when a subscriber changes it subscription. First, the SPR 110 receives a change in a subscriber's information from an external portal. For example, the subscriber may buy more usage, may change plans where the various limits applied to the subscriber are now different, or may add a new service. Next, the SPR 110 sends a SPR change message to both the OCS 130 and PCRF 105 indicating the change in the subscriber information. The PCRF 105 may bind new counter information to the subscriber and make a policy decision based upon the new subscriber information. PCRF 105 may then send a Gx RAR message to the PCEF 125 to effect the policy changes. PCEF 125 may send a Gx RAA message back to PCRF 105 to acknowledge receipt of the Gx RAA message.

The embodiments disclosed may provide for the PCRF to offload usage metering to the OCS, which may already be available in the system. The PCRF may include a powerful and flexible rule engine that determines actions and policies related to subscriber usage of the mobile network. The PCRF may use the metering results from the OCS to provide usage information for use in the rules engine.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method for managing subscriber usage in a mobile network by a policy and charging rules function (PCRF) device comprising:
   receiving, by the PCRF device, a credit control request (CCR) message from a policy and enforcement rules function (PCEF) for an application;
   determining, by the PCRF device, whether an Sy connection to an online charging system (OCS) is necessary to implement the CCR;
   determining, by the PCRF device, whether an Sy session is present;
   sending, by the PCRF device, an application authorization request (AAR) message to the OCS;
   receiving, from the OCS, an application authorization answer (AAA) message including an Sy counter used by the OCS to track usage associated with a user of the application;
   mapping, by the PCRF device, a PCRF metering limit to the Sy counter, wherein the PCRF metering limit is an object used by the PCRF to determine policies to apply in response to reported usage;
   binding, by the PCRF device, the PCRF metering limit to the application;

determining, by the PCRF device, a policy to apply based upon the application, the PCRF metering limit, and usage reported by the OCS via the Sy counter; and sending, by the PCRF device, a message to the PCEF to effect the policy.

2. The method of claim 1, further comprising:
receiving an indication from the OCS that a usage threshold has been crossed;
determining a policy to apply based upon the threshold crossing; and
sending a reauthorization request (RAR) message to the PCEF to effect the policy.

3. The method of claim 2, further comprising
sending a message to the subscriber.

4. The method of claim 3, wherein the message includes usage information and a usage limit.

5. The method of claim 2, further comprising
denying the subscriber access to the mobile network.

6. The method of claim 2, wherein determining a policy to apply includes reducing the quality of service.

7. The method of claim 1, further comprising:
receiving subscriber change message from a subscriber profile repository (SPR);
determining a policy to apply based upon the subscriber change message from the SPR; and
sending a reauthorization request (RAR) message to the PCEF to effect the policy.

8. A tangible and non-transitory machine-readable storage medium encoded with instructions thereon for execution by a policy and charging rules function (PCRF), wherein said tangible and non-transitory machine-readable storage medium comprising:
instructions for receiving, by the PCRF, a credit control request (CCR) message from a policy and enforcement rules function (PCEF) for an application;
instructions for determining, by the PCRF, whether an Sy connection to an online charging system (OCS) is necessary to implement the CCR;
instructions for determining, by the PCRF, whether an Sy session is present;
instructions for sending, by the PCRF, an application authorization request (AAR) message to the OCS;
instructions for receiving, from the OCS, an application authorization answer (AAA) message including an Sy counter used by the OCS to track usage associated with a user of the application;
instructions for mapping, by the PCRF device, a PCRF metering limit to the Sy counter, wherein the PCRF metering limit is an object used by the PCRF to determine policies to apply in response to reported usage;
instructions for binding, by the PCRF, the PCRF metering limit to the application;
instructions for determining, by the PCRF, a policy to apply based upon the application, the PCRF metering limit, and usage reported by the OCS via the Sy counter; and
instructions for sending, by the PCRF, a credit control answer (CCA) message to the PCEF to effect the policy.

9. The tangible and non-transitory machine-readable storage medium of claim 8, further comprising:
instructions for receiving an indication from the OCS that a usage threshold has been crossed;
instructions for determining a policy to apply based upon the threshold crossing; and
instructions for sending a reauthorization request (RAR) message to the PCEF to effect the policy.

10. The tangible and non-transitory machine-readable storage medium of claim 9, further comprising
instructions for sending a message to the subscriber.

11. The tangible and non-transitory machine-readable storage medium of claim 10, wherein the message includes usage information and a usage limit.

12. The tangible and non-transitory machine-readable storage medium of claim 9, further comprising
instructions for denying the subscriber access to the mobile network.

13. The tangible and non-transitory machine-readable storage medium of claim 9, wherein determining a policy to apply includes
reducing the quality of service.

14. The tangible and non-transitory machine-readable storage medium of claim 8, further comprising:
instructions for receiving subscriber change message from a subscriber profile repository (SPR);
instructions for determining a policy to apply based upon the subscriber change message from the SPR; and
instructions for sending a reauthorization request (RAR) message to the PCEF to effect the policy.

* * * * *